United States Patent Office 3,454,872
Patented July 8, 1969

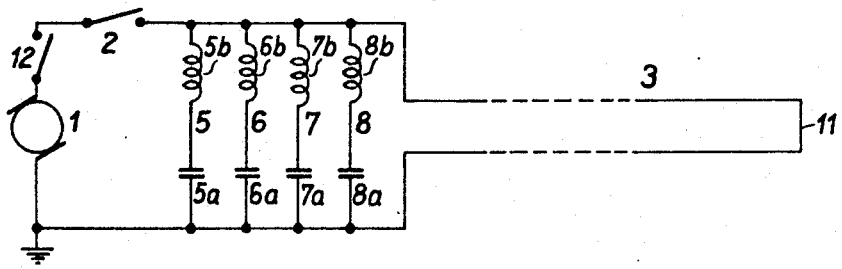
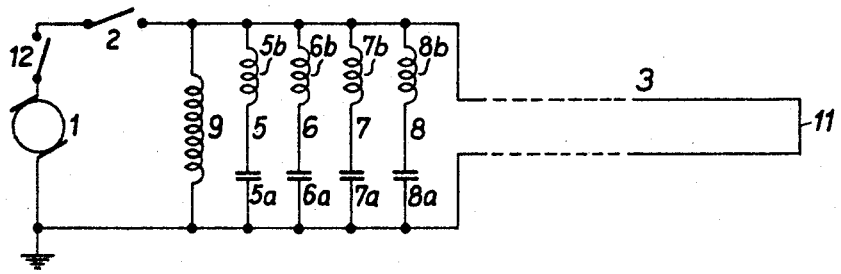
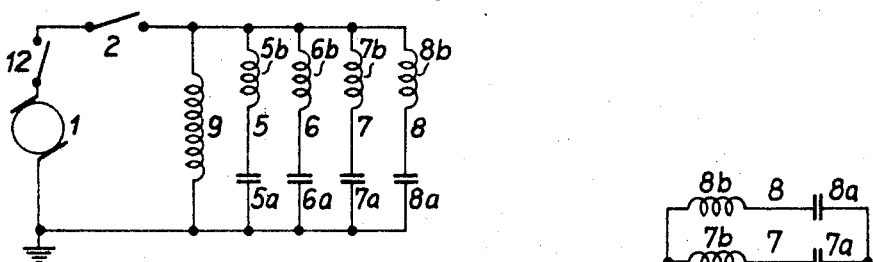
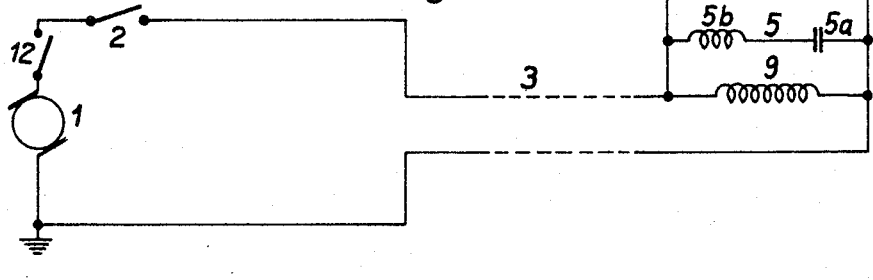

3,454,872
CIRCUIT FOR TESTING A HIGH POWER CIRCUIT BREAKER WITH A STRESS SIMULATING A REMOTE SHORT LINE FAULT
Gerd Kummerow, Berlin, Germany, assignor to Siemens-Aktiengesellschaft, Berlin-Siemensstadt, Germany, a corporation of Germany
Filed Feb. 26, 1965, Ser. No. 435,477
Claims priority, application Germany, Feb. 28, 1964,
S 89,735
Int. Cl. G01r *31/28;* H03h *7/10*
U.S. Cl. 324—28
5 Claims

ABSTRACT OF THE DISCLOSURE

A circuit for testing a high power circuit breaker with a stress simulating a remote short-line fault comprising an A.C. source in series with the circuit breaker and a load. The load comprises a plurality of parallel connected circuit branches. Each of the circuit branches comprises a capacitor and an inductor in series connection. The circuit branches are tuned to different frequencies. A reactor coil is connected in parallel with the circuit branches.

---

The present invention relates to a circuit for testing a circuit breaker. More particularly, the invention relates to a circuit for testing a circuit breaker with a stress simulating a short-line fault.

The stress imposed upon circuit breakers by short circuits may vary greatly. The short circuit may, for example, appear directly at the terminals of the circuit breaker. In this case, it is known as a terminal short circuit. The short circuit may, on the other hand, appear on the line remote from the circuit breaker. In this case, it is known as a short-line fault.

In the case of a terminal short circuit, the short-circuit current is a maximum and in the case of a short-line fault, the short-circuit current is less. The rate of rise of the voltage appearing across the gap of the circuit breaker after the extinction of the arc in the case of a short-line fault may be greater than in a terminal short circuit, depending upon the distance at which the short circuit occurs in the transmission line. It is therefore insufficient to test a circuit breaker for terminal short circuit only, but it is necessary to test it under short-line fault conditions, as well.

A short transmission line is often available in a high-power test station and may be used for the testing of the circuit breaker, i.e. to simulate its stress by a short-line fault. Generally, however, even if the line has a suitable or proper inductance, the characteristic impedance of the line is not suitable. The characteristic impedance may be too great, for example, especially when only one interrupting gap of a circuit breaker having several interrupting gaps is to be tested. The characteristic impedance in such a case must be reduced.

In a known testing circuit, capacitors are provided at several places in the transmission line in order to reduce the characteristic impedance. The greater the number of capacitors utilized, the more accurately simulated is the transient voltage built up in the line. The oscillatory voltage built up in the line has a sawtooth waveshape at the beginning of said line when the said line is interrupted by an ideal circuit breaker. An ideal circuit breaker is one without residual current and arc voltage. In practice, however, the installation of the capacitors is difficult, so that it is also difficult to adjust the characteristic impedance to different test requirements.

The principal object of the present invention is to provide a new and improved circuit for testing a circuit breaker under short-line fault conditions.

In accordance with the present invention, a circuit for testing a circuit breaker with a stress simulating a short-line fault comprises as a load for the circuit breaker a plurality of circuit branches which are connected in parallel. Each of the circuit branches comprises a capacitor and an inductor connected in series and each series connected circuit branch is tuned to a different frequency.

If the circuit for testing a circuit breaker is to be used to reduce the characteristic impedance of the transmission line, it is provided at the beginning of said transmission line. A reactor coil may be connected in parallel with the parallel-connected circuit branches of the test circuit. The reactor coil is connected in parallel with the circuit branches when the simulated length of the transmission line is to be reduced. The reactor coil functions to simulate a short circuit closer to the circuit breaker. If the inductance of the transmission line is to be increased, so that in effect the line is extended, the testing circuit comprising the reactor coil in parallel with the circuit branches is provided at the end of the line. In this case the additional circuit comprising the reactor coil connected in parallel with the circuit breaker must be adjusted so that its characteristic impedance is equal to the characteristic impedance of the transmission line. The capacitors and inductors are easily accessible, since they are positioned in the same place, and they may therefore be readily and facilely adjusted in characteristic impedance.

The testing circuit comprising the reactor coil connected in parallel with the circuit branches may even be used without a real transmission line for simulating testing conditions of a short-line fault.

Heretofore, T or Pi connected components were utilized to simulate a transmission line. In contrast, an advantage of the testing circuit of the present invention is that the inductors of the circuit branches do not have to conduct the short-circuit current.

In order that the present invention may be readily carried into effect, it will now be described with reference to the accompanying drawing, wherein:

FIG. 1 is a circuit diagram of an embodiment of a testing circuit of the present invention;

FIG. 2 is a circuit diagram of another embodiment of a testing circuit of the present invention;

FIG. 3 is a circuit diagram of a modification of the embodiment of FIG. 2; and

FIG. 4 is a circuit diagram of another modification of the embodiment of FIG. 2.

In the figures, the same components are identified by the same reference numerals.

There are requirements for a circuit breaker which indicate the distance of the short circuits at which the circiut breaker is to be tested. This enables determination of the characteristic impedance of the transmission line, the length of the transmission line and the transient voltage which would occur upon interruption of the line by an ideal circuit breaker. The requirements may, for example, indicate the rate of rise and amplitude of the voltage. The inductance and capacitance values of the inductors and capacitors of the circuit branches of the testing circuit may be determined from the transient voltage or the characteristic impedance and length of the transmission line or from the rate of rise and amplitude of the voltages.

The inductance and capacitance values of the inductors and capacitors of the testing circuit may also be determined experimentally. For experimental determination, a voltage which is very low relative to the nominal voltage of the transmission line is utilized. Furthermore, a circuit breaker which functions ideally, such as, for example, a vacum circuit breaker, is utilized. The determined inductance and capacitance values then provide the proper transient voltage when the circuit breaker tested is not an ideal one.

In the embodiment of FIG. 1, a source of alternating voltage 1 is connected to one terminal of a circuit breaker 2 which is to be tested. The transimission line 3, in the vicinity of the test station, is short-circuited at its end 11. A station breaker 12 is connected in series with the circuit breaker 2.

The testing circuit of the present invention, for testing the circuit breaker 2, comprises a plurality of parallel connected circuit branches 5, 6, 7 and 8 connected in series with said circuit breaker. Each of the circuit branches 5, 6, 7 and 8 comprises a capacitor and an inductor connected in series and each series connected circuit branch is tuned to a different frequency. Thus, the first circuit branch 5 comprises a capacitor 5a and an inductor 5b. The capacitor 5a and the inductor 5b are tuned to a first frequency.

The second circuit branch 6 comprises a capacitor 6a and an inductor 6b. The capacitor 6a and the inductor 6b are tuned to a second frequency different from the first frequency. The third circuit branch 7 comprises a capacitor 7a and an inductor 7b. The capacitor 7a and the inductor 7b are tuned to a third frequency different from the first and second frequencies. The fourth circuit branch 8 comprises a capacitor 8a and an inductor 8b. The capacitor 8a and the inductor 8b are tuned to a fourth frequency different from the first, second and third frequencies.

In the embodiment of FIG. 1, the circuit branches 5, 6, 7 and 8 are connected at the beginning of the transmission line, between the circuit breaker 2 and the transmission line 3. The testing circuit of the present invention, comprising the circuit branches 5, 6, 7 and 8, in FIG. 1, reduces the characteristic impedance of the transmission line. That is, the testing circuit reduces the characteristic impedance of the entire circuit including the testing circuit and the transmission line in comparison with the characteristic impedance of the transmission line alone.

When the circuit breaker 2 is to be tested, said circuit breaker is first closed. The station breaker 12 is then closed, in the usual operating procedure, and the circuit breaker 2 is opened. The short-circuited transmission line and the testing circuit then provide the proper oscillatory line voltage. That is, in the embodiment of FIG. 1, the transmission line and the testing circuit provide the voltage between the right-hand terminal of the circuit breaker 2 and ground. The voltage across the terminals of tthe circuit breaker 2 is being determined by the difference between the voltage of the left-hand terminal of the circuit breaker and ground and the voltage of the right-hand terminal and ground.

In the embodiment of FIG. 2, a reactor coil 9 is connected in parallel with the circuit branches 5, 6, 7 and 8. The reactor coil 9 functions to reduce the inductance of the transmission line and thus simulates a short circuit at a point closer to the circuit breaker 2. This corresponds to a reduced simulated length of transmission line. When the reactor coil 9 is utilized, the circuit branches 5, 6, 7 and 8 must be adjusted different from the adjustments of the circuit branches of the embodiment of FIG. 1 with the same redduction of characteristic impedance.

FIG. 3 illustrates the utilization of the testing circuit of the present invention without a transmission line. The transmission line is simulated by the testing circuit comprising the reactor coil 9 and the parallel connected circuit branches 5, 6, 7 and 8, only. Instead of the utilization of a plurality of components spaced throughout the transmission line, the testing circuit of the present invention utilizes the reactor coil 9 which conducts the entire short-circuit current in the modification of FIG. 3 and which conducts a portion of the short-circuit current in the embodiment of FIG. 2. In the embodiment of FIGS. 1, 2 and 3 the inductors 5b, 6b, 7b and 8b conduct a current which is considerably less than the short-circuit current, since in FIG. 1 the transmission line 3 conducts the complete short-circuit current. In FIG. 2 the transmission line 3 and the reactor coil 9 conduct the complete short-circuit current. In FIG. 3 the reactor coil 9 conducts the complete short-circuit current.

In the modification of FIG. 4, the transmission line 3 is closed by the reactor coil 9 and the circuit branches 5, 6, 7 and 8 are connected in paralled to said reactor coil. In this modification, where the testing circuit is provided at the end of the line, the simulated length of the transmission line is increased.

In the modification of FIG. 4, as in the embodiment of FIG. 2, the inductors 5b, 6b, 7b and 8b conduct a current which is considerably less than the short-circuit current, since the reactor coil 9 conducts a portion of such short-circuit current. The testing circuit must be adjusted to have a characteristic impedance which is equal to the characteristic impedance of the transmission line.

In the figures, the testing circuit is illustrated for single terminal testing of a circuit breaker with a stress simulating a short-line fault. The testing circuit of the present invention may also be utilized for synthetic testing of a circuit breaker under short-line fault conditions as well.

Thus, for example, synthetic test circuits with voltage injection such as, for example, that shown in Elektrotechnische Zeitschrift, 1963, pages 581 to 586, FIG. 12, may utilize the testing circuit of the present invention in its high current circuit to simulate a short-line fault. Furthermore, in other types of synthetic test circuits such as, for example, circuits with current injection, as illustrated in FIG. 4 of the same paper, the testing circuit of the present invention may be utilized to simulate a short-line fault.

It is suitable to provide equal inductance values for the inductors 5b, 6b, 7b and 8b of the first, second, third and fourth circuit branches 5, 6, 7 and 8. When a reactor coil 9 is connected in parallel with the circuit branches 5, 6, 7 and 8, each of the inductors may be provided with an inductance value half of the inductance of the reactor coil 9. The greater the number of circuit branches utilized, the easier it is to adjust the testing circuit to simulate actual conditions. Three or four circuit branches have been found to be preferable for good results.

I claim:
1. In a circuit for testing a high power circuit breaker with a stress simulating a remote shortline fault, a reactor coil, a source of alternating voltage for providing a required high power current of thousands of amperes, said current flowing through said circuit breaker and said reactor coil, a plurality of parallel connected circuit branches connected in series with said circuit breaker and in parallel with said reactor coil, each of said circuit branches comprising a capacitor and an inductor in series connection, said circuit branches being tuned to different frequencies for simulating the transient voltage of a short-line fault.

2. In a circuit for testing a high power circuit breaker with a stress simulating a remote shortline fault as claimed in claim 1, wherein the inductors of said circuit branches have the same indutcance value.

3. In a circuit for testing a high power circuit breaker with a stress simulating a remote shortline fault as claimed in claim 1, wherein each of said inductors has an inductance value approximately half that of said reactor coil.

4. In a circuit for testing a high power circuit breaker with a stress simulating a remote shortline fault as claimed in claim 1, wherein said reactor coil comprises a transmission line.

5. In a circuit for testing a high power circuit breaker with a stress simulating a remote shortline fault as claimed in claim 1, further comprising a transmission line connecting said plurality of circuit branches and said reactor coil to said circuit branches.

References Cited

UNITED STATES PATENTS 2,835,872   5/1958   Pierce _____ 333—23 XR

FOREIGN PATENTS 116,136   8/1957   Russia.
85,696    3/1927   Austria.

RUDOLPH V. ROLINEC, *Primary Examiner.*

E. L. STOLARUN, *Assistant Examiner.*

U.S. Cl. X.R.

323—76, 80; 333—23, 70, 84